United States Patent [19]

Gruffaz et al.

[11] 4,043,986
[45] Aug. 23, 1977

[54] POLYMERS POSSESSING IMIDE GROUPS

[75] Inventors: Max Gruffaz, La Mulatiere; Gérard Lefebvre, Lyon, both of France

[73] Assignee: Rhone-Poulenc Industries, Paris, France

[21] Appl. No.: 568,447

[22] Filed: Apr. 16, 1975

[30] Foreign Application Priority Data

Apr. 18, 1974  France .............. 74.13529

[51] Int. Cl.² .......................................... C08G 69/26
[52] U.S. Cl. .............. 260/78 UA; 260/37 N; 260/42.43; 260/47 CZ; 260/47 UA; 260/63 N; 260/65; 428/474; 526/11.1
[58] Field of Search ........ 260/78 UA, 47 UA, 47 CZ

[56] References Cited

U.S. PATENT DOCUMENTS 3,669,930  6/1972  Asahara et al. ............... 260/78 UA Primary Examiner—Harold D. Anderson
Attorney, Agent, or Firm—Stevens, Davis, Miller & Mosher

[57] ABSTRACT

Polymers possessing imide groups having excellent heat resistance and chemical inertness are disclosed. They are prepared by reacting cyanamide and a product possessing imide groups selected from:

a. a bis-imide of the general formula:

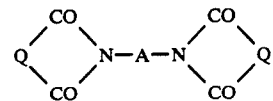

in which Q represents a divalent radical of the formula:

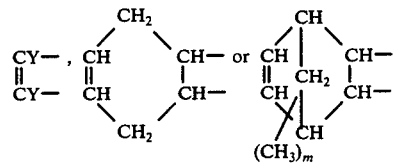

wherein Y represents H, $CH_3$ or Cl and $m$ is 0 or 1, and A represents a divalent organic radical containing 2 to 30 carbon atoms; and b. a mixture comprising a said bis-imide and a mono-imide of the general formula:

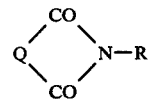

in which Q is as defined above and R represents a hydrogen atom or a monovalent organic radical containing 1 to 20 carbon atoms.

10 Claims, No Drawings

POLYMERS POSSESSING IMIDE GROUPS

The present invention relates to polymers possessing imide groups.

Heat-resistant polymers have been prepared by reacting a bis-imide of an unsaturated dicarboxylic acid such as a bis-malemide with a diprimary diamine (see, for example, French Pat. No. 1,555,564). Thereafter, it has been proposed (see, for example, U.S. Pat. No. 3,669,930) to improve some of the properties of these polymers by reducing their crosslinking density by using monoamines, or mixtures of polyamines, or mono- and poly-amines, instead of the diprimary diamine.

New polymers possessing imide groups have now been found, according to the present invention, which are prepared by reacting cyanamide and a product possessing imide groups which is either:

a. a bis-imide of the general formula:

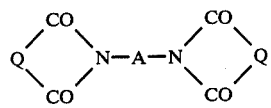

(I)

in which the symbol Q represents a divalent radical which can be one of the radicals of the formula:

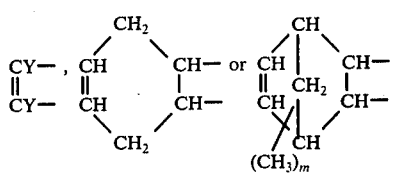

wherein Y represents H, $CH_3$ or Cl and $m$ is equal to 0 or 1, and the symbol A represents a divalent organic radical containing 2 to 30 carbon atoms; or b. a mixture comprising a bis-imide of the formula (I) and a mono-imide of the formula:

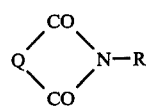

(II)

in which the symbol Q is as defined above and the symbol R represents a hydrogen atom or a monovalent organic radical containing 1 to 20 carbon atoms.

In formula (I) the symbol A can represent, for example, a hydrocarbon radical with 2 to 20 carbon atoms free from unsaturated bonds other than aromatic bonds, a mono- or bis-heterocyclic radical with 2 to 10 carbon atoms, or an organic radical with 4 to 20 carbon atoms consisting of several hydrocarbon radicals as defined above, connected to one another via an inert radical. Thus the hydrocarbon radicals which the symbol A can represent can be, for example, a linear or branched alkylene radical with 2 to 12 carbon atoms, a phenylene radical, a cyclohexylene radical, a naphthylene radical, a biphenylylene radical, a xylylene radical or a radical of the formula:

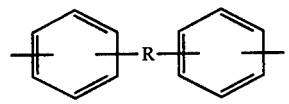

in which the symbol R denotes an alkylene radical with 1 to 3 carbon atoms optionally substituted by a phenyl radical. The phenylene radicals can be substituted by groups such as $CH_3$ or $OCH_3$ or by a chlorine atom.

When, in formula (I), the symbol A represents a heterocyclic radical, it can be, for example, a radical of the formula:

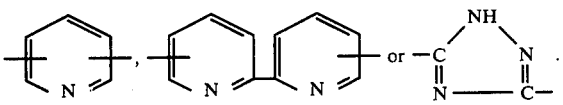

When the symbol A represents a radical consisting of several hydrocarbon radicals connected via an inert group, this inert group can be, for example, —O—, —S—, —CO—, —$SO_2$—, —$NR_1$, —N=N—, —CONH—, —COO—, —P(O)$R_1$—, —CONH—X—NHCO—, —NHCO—X—CONH—,

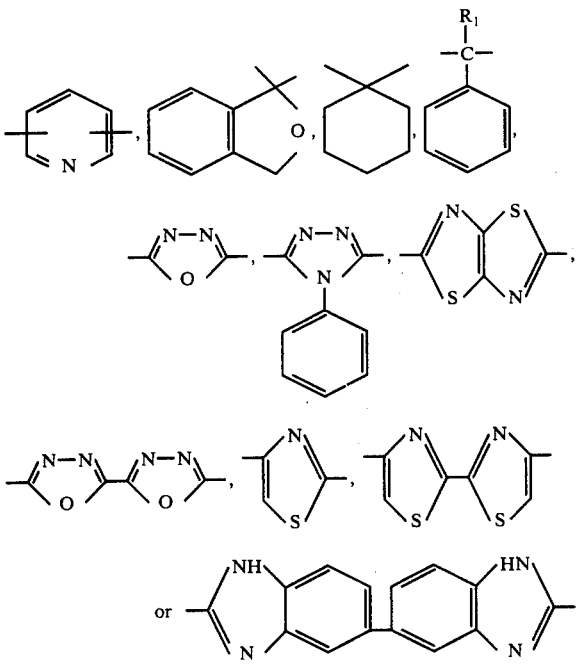

wherein $R_1$ represents a hydrogen atom, an alkyl radical with 1 to 4 carbon atoms, a phenyl radical or a cyclohexyl radical, and X represents a divalent hydrocarbon radical with 2 to 12 carbon atoms.

Specific examples of bis-imides include the following compounds: N,N'-ethylene-bis-maleimide, N,N'-hexamethylene-bis-maleimide, N,N'-meta-phenylene-bis-maleimide, N,N'-para-phenylene-bis-maleimide, N,N'-4,4'-biphenylylene bis-maleimide, N,N'-4,4'(diphenylmethane-bis-maleimide, N,N'-4,4'-(diphenyl ether)-bis-maleimide, N,N'-4,4'-(diphenyl sulphide)-bis-maleimide, N,N'-4,4'-(diphenyl-sulphone)-bis-maleimide, N,N'-4,4'-dicyclohexylmethane-bis-maleimide, N,N'-α,α'-4,4'-dimethylenecyclohexane-bis-maleimide, N,N'-meta-xylylene-bis-maleimide, N,N'-para-xylylenebis-maleimide, N,N'-4,4'-(1,1-diphenyl-cyclohexane)-bis-maleimide, N,N'-4,4'-diphenylmethane-bis-citraconimide, N,N'-4,4'-(diphenyl ether)-bis-endomethylenetetrahydrophthalimide, N,N'-4,4'-diphenylmethane-bis-chloromaleimide, N,N'-4,4'-diphenylmethane-bis-tetrahydrophthalimide, N,N'-4,4'-(1,1-diphenyl-propane)-bis-maleimide, N,N'-4,4'-(1,1,1-triphenyl-ethane)-bis-maleimide, N,N'-4,4'-triphenylmethane-bis-maleimide, N,N'-3,5-(1,2,4-triazole)- bis-maleimide, N,N'-dodecamethylene-bis-maleimide, N,N'-(2,2,4-trimethyl-hexamethylene)-bis-maleimide, 1,2-bis-(2-maleimido-ethoxy)-ethane, 1,3-bis-(3-maleimido-propoxy)-propane, N,N'-4,4'-benzophenone-bis-maleimide, N,N'-pyridine-2,6-diyl-bis-malemide, N,N'-(1,5-naphthylene)-bis-maleimide, N,N'-(1,4-cyclohexylene)-bis-maleimide, N,N'-[1,3-(5-methyl-phenylene)]-bis-maleimide and N,N'-[1,3-(5-methoxy-phenylene)]-bis-maleimide.

These bis-imides can be prepared by applying the methods described in, for example U.S. Pat. No. 3,018,290 and British Patent Specification No. 1,137,592.

In formula II, the symbol R can represent, for example, a linear or branched alkyl or alkenyl radical which can contain up to 20 carbon atoms, a cycloalkyl radical containing 5 or 6 carbon atoms in the ring, a monocyclic or bicyclic aryl, alkylaryl or aralkyl radical containing up to 20 carbon atoms, a radical of the formula: /

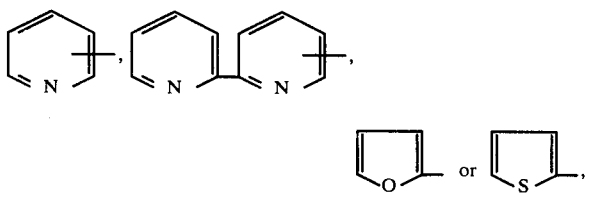

or a monovalent radical consisting of a phenyl radical and a phenylene radical bonded to one another via a single valency bond or via an inert atom or group such as —O—, —S—, an alkylene radical with 1 to 3 carbon atoms, —CO—, —SO₂—, —NR₁—, —N=—, —CONH— and —COO—, wherein R₁ is as defined above. Moreover, these various radicals can be substituted by one or more atoms, radicals or groups such as F, Cl, CH₃, —OC₂H₅, —OH, NO₂, —COOH, —NH-COCH₃ and

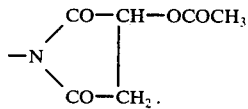

Specific examples of mono-imides of formula II include maleimide, N-phenylmaleimide, N-phenylmethyl-maleimide, N-phenylchloromaleimide, N-p-chlorophenylmaleimide, N-p-methoxyphenylmaleimide, N-p-methylphenylmaleimide, N-p-nitrophenylmaleimide, N-p-phenoxyphenylmaleimide, N-p-phenylamino-phenylmaleimide, N-p-phenoxycarbonylphenylmaleimide, N-p-phenylcarbonylphenylmaleimide, 1-maleimido-4-acetoxysuccinimido-benzene, 4-maleimido-4'-acetoxysuccinimidodiphenylmethane, 4-maleimido-4'-acetoxysuccinimido-diphenyl ether, 4-maleimido-4'-acetamido-diphenyl ether, 2-maleimido-6-acetamido-pyridine, 4-maleimido-4'-acetamido-diphenylmethane, N-methylmaleimide, N-ethylmaleimide, N-vinylmaleimide, N-allymaleimide, N-cyclohexylmaleimide and N-decymaleimide.

These mono-imides can be prepared by applying the methods described in, for example, U.S. Pats. Nos. 2,444,536 and 3,717,615 or in DOS 2,354,654.

When a mixture of a bis-imide of formula (I) and a mono-imide of the formula (II) is used, the number of imide groups supplied by the mono-imide suitably represents up to 30% of the total number of imide groups supplied by the mixture.

The reaction conditions for the preparation of the polymers according to this invention can vary within wide limits. Thus the ratio $$\frac{\text{number of imide groups}}{\text{number of mols of cyanamide}} \quad (r)$$

can be, for example, from 1 to 20. In general terms, the reaction temperature is from 50° to 300° C.

The polymers according to the invention can be prepared in bulk by heating a mixture of cyanamide and the product possessing imide groups, at least until a homogeneous liquid is obtained; in the remainder of this Specification, this mixture will be denoted by the expression "mixture of the reagents". Before heating the mixture of the reagents, it is advantageous to homogenise them.

The polymers according to the invention can also be prepared by heating a mixture of the reagents in an organic diluent which is liquid in at least part of the range 50°–300° C i.e. has a boiling point in this range. Amongst these diluents, there may be mentioned, in particular, polar organic solvents such as dimethylformamide, N-methylpyrrolidone, dimethlacetamide, N-methlycaprolactam, diethylformamide, N-acetylpyrrolidone and cresols, as well as hydrocarbons, chlorinated hydrocarbons, linear or cyclic ethers and nitriles. The solutions or suspensions of polymers can be used direct for many purposes; it is also possible to isolate the polymers, for example by filtration, if necessary after precipitation by means of an organic diluent which is miscible with the solvent used. In this context, a hydrocarbon, the boiling point of which is not much above 120° C, is advantageously used.

The polymers can be prepared in the presence of a free radical inhibitor such as one of those mentioned in "Encyclopedia of Polymer Science and Technology" volume 7, pages 644 to 662.

Polymers for which the proportions of the starting reagents are such that the ratio (r) is at least equal to 2, preferably from 2.2 to 10, are of particular value.

It is to be understood that the properties of the polymers according to the invention vary to a very large extent depending on the exact nature of the product possessing imide groups, the proportions chosen and the precise temperature conditions adopted.

In relation more particularly to the polymers for which the ratio (r) is at least equal to 2, these can be cured polymers which are insoluble in the usual solvents and which do not soften to any marked extent below the temperature at which they begin to undergo degradation. However, these polymers can also be in the form of prepolymers which are soluble in polar organic solvents and possess a softening point at a temperature not exceeding 250°C. These prepolymers can be prepared in bulk by heating the mixture of the reagents until a homogeneous or paste-like product is obtained at a temperature generally from 50° to 180° C. The prepolymers can also be prepared in suspension or in solution in a diluent which is liquid in at least part of the range 50°–180° C, preferably in a polar organic solvent.

The prepolymers can be used in the form of a liquid mass, a simple hot casting operation being sufficient to effect shaping. It is also possible, after cooling and grinding, to use them in the form of powders which are remarkably suitable for compression moulding operations, optionally in the presence of fillers in the form, for example, powders, spheres, granules, fibres, or flakes. In the form of suspensions or solutions, the prepolymers can be used to produce coverings and preimpregnated intermediate articles, the reinforcement of which can consist of fibrous materials based on, for example, aluminium or zirconium silicate or oxide, carbon, graphite, boron, asbestos or glass.

In a second step, the prepolymers can be cured by heating to temperatures of the order of 350° C, generally from 150° to 300° C; a supplementary shaping operation can be carried out during the curing process, optionally at a pressure above or below atmospheric pressure, it also being possible for these operations to be consecutive. Curing is suitably effected in the presence of a radical-type polymerisation initiator such as lauroyl peroxide or azo-bis-isobutyronitrile, or in the presence of an anionic polymerisation catalyst such as diazabicyclooctane.

The polymers according to the invention can also contain, by way of an adjuvant, an aromatic compound (AR) which possesses 2 to 4 benzene rings, which does not sublime at atmospheric pressure up to 250° C and the boiling point of which is at least 250° C; the addition of these aromatic compounds affects the prepolymers more particularly, because they generally tend to lower their softening point. Suitable aromatic compounds are described in U.S. Pat. No. 3,679,639, the disclosure of which is hereby incorporated by reference.

The polymers according to the present invention can also be modified by the addition, before curing, of a monomer (M), other than an imide, which possesses at least one polymerisable —CH = C < group which can be of the vinyl, maleic, allyl and acrylic type. The monomers can possess several —CH = C < groups provided that the double bonds are not conjugated. In one and the same monomer, these groups can belong to one and the same type or they can be of different types. It is possible to employ a single monomer or a mixture of copolymerisable monomers. The monomers which can be used are mentioned in U.S. Ser. No. 156,033 filed June 23, 1971, the disclosure of which is hereby incorporated by reference.

The monomer (M) can be added to the prepolymer or can be introduced into the mixture at any instant during it preparation. The amount used is generally chosen so that it represents less than 50%, and preferably 5 to 40%, of the weight of prepolymer or of the weight of the mixture of the reagents. The prepolymer modified by the monomer (M) can be cured in the same way as the unmodified prepolymer.

The polymers according to the invention can also be modified by the addition, before curing, of an unsaturated polyester.

The procedures relating to the introduction and the amounts of unsaturated polyester, as well as to the curing operations to form resins, are identical to those which have been described for the monomer (M).

The incorporation of a monomer (M) or of an unsaturated polyester leads to curable mixtures which can be used as impregnation resins; after adding fillers, they can be employed as coating masses.

The polymers according to this invention are of value in the fields of industry which require materials possessing good mechanical and electrical properties as well as great chemical inertness at temperatures of the order of 200° C to 300° C. By way of example, they are suitable for manufacturing tubular or plate insulators for electrical transformers, printed circuits, gearwheels, and self-lubricating rings and stops.

In relation, more particularly, to the polymers for which the ratio (r) is at least equal to 2, they possess, in addition to their heat-resistance and other valuable properties, a high impact strength. This property, also called resilience, is particularly desirable both when machining articles and when placing them in position or operating them at a high temperature. This combination of properties is particularly sought after when the articles are used, for example, as compressor segments or valve seats.

The following Examples further illustrate the present invention.

EXAMPLE 1

75 g of N,N'-4,4'-diphenylmethane-bis-maleimide and 4.4 g of cyanamide are introduced into a container kept in a fluid heated to 170° C.

When the mixture begins to melt, it is stirred and the dissolved air is removed by reducing the pressure to 100 mm Hg. The mixture is then kept for 5 minutes in the molten state.

The liquid mixture is then cast in a parallelepiped shaped mould (125 × 75 × 6 mm), the inside wall of which possesses a silicone coating, heated beforehand to 200° C.

The whole is left at this temperature for 24 hours and the moulded article is then released from the mould whilst hot and subjected to a supplementary heat treatment for 24 hours at 250° C.

The article then possesses a flexural breaking strength of 11.3 kg/mm$^2$ at 25° C. After a heat test at 250° C for 500 hours, the flexural strength, measured at 25° C, is still 9.2 kg/mm$^2$.

EXAMPLE 2

71.6 g of N,N'4,4'-diphenylmethane-bis-maleimide and 8.4 g of cyanamide are introduced into a container kept in a fluid heated to 160° C.

A prepolymer is prepared from this mixture and a moulding operation is effected by casting under the conditions described in Example 1, the mould being preheated to 150° C.

When the casting operation has been carried out; the whole is left for 16 hours at 150° C and then the moulded article is released from the mould whilst hot. The moulded article is subjected to a supplementary heat treatment for 24 hours at 200° C and then for 24 hours at 250° C.

The article then possesses a flexural breaking strength of 21 kg/mm$^2$ at 25° C. After a heat test carried out for 1,000 hours at 250° C. the flexural strength, measured at 25° C, is still 13.7 kg/mm$^2$.

The article also possesses an impact strength of 39 kg.cm/cm$^3$ (Standard Specification DIN 51,230 ) at 25° C.

We claim:

1. A process for preparing a polymer possessing imide groups, which consists essentially of reacting, at 50° to 300° C., cyanamide and a product possessing imide groups selected from the group consisting of:

a. a bis-imide of the general formula:

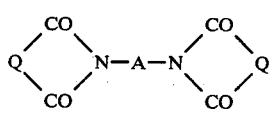

in which Q represents a divalent radical of the formula:

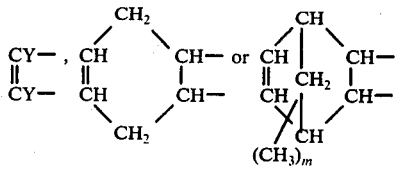

wherein Y represents H, CH$_3$ or Cl and $m$ is 0 or 1, and A represents a divalent organic radical containing 2 to 30 carbons atoms; and b. a mixture of said bis-imide and a mono-imide of the general formula:

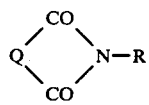

in which Q is as defined above and R represents a hydrogen, atom or a monovalent organic radical containing 1 to 20 carbon atoms, in amounts such that the ratio $$\frac{\text{number of imide groups}}{\text{number of mols of cyanamide}} \quad (r)$$

is from 1 to 20.

2. A cured resin having excellent heat resistance and chemical inertness obtained by a process as defined in claim 1.

3. A process according to claim 1, in which the ratio (r) is at least equal to 2.

4. A process according to claim 1, in which the ratio (r) is from 2.2 to 10.

5. A process according to claim 1, in which the number of imide groups supplied by the mono-imide represents up to 30% of the total number of imide groups supplied by the mixture of mono- and bis-imide.

6. A process according to claim 1, in which the bis-imide is N,N'-4,4'-diphenylmethane-bis-maleimide.

7. A process according to claim 1, in which the reaction is carried out in bulk.

8. A process according to claim 1, in which the reaction is carried out in an organic diluent having a boiling point from 50° to 300° C.

9. A process according to claim 1, in which an aromatic compound which possesses 2 to 4 benzene rings, which does not sublime at atmospheric pressure up to 250° C and which has a boiling point of at least 250° C is incorporated into the reaction mixture.

10. A prepolymer possessing a softening point not exceeding 250° C obtained by a process as defined in claim 1.

* * * * *